United States Patent
Jones et al.

(10) Patent No.: US 10,693,897 B2
(45) Date of Patent: Jun. 23, 2020

(54) BEHAVIORAL AND ACCOUNT FINGERPRINTING

(71) Applicant: Facebook, Inc., Menlo Park, CA (US)

(72) Inventors: Benjamin Roy Jones, Austin, TX (US); Samuel Webb Jones, Austin, TX (US)

(73) Assignee: Facebook, Inc., Menlo Park, CA (US)

( * ) Notice: Subject to any disclaimer, the term of this patent is extended or adjusted under 35 U.S.C. 154(b) by 266 days.

(21) Appl. No.: 15/842,212

(22) Filed: Dec. 14, 2017

(65) Prior Publication Data

US 2019/0190933 A1 Jun. 20, 2019

(51) Int. Cl.
*H04L 29/06* (2006.01)
*G06F 16/2458* (2019.01)
*G06F 16/28* (2019.01)
*G06F 21/00* (2013.01)

(52) U.S. Cl.
CPC ...... *H04L 63/1425* (2013.01); *G06F 16/2474* (2019.01); *G06F 16/285* (2019.01); *G06F 21/00* (2013.01)

(58) Field of Classification Search
CPC ... H04L 63/1425; G06F 21/00; G06F 16/285; G06F 16/2474
See application file for complete search history.

(56) References Cited

U.S. PATENT DOCUMENTS

| 8,108,923 B1* | 1/2012 | Satish | G06F 21/552 |
| | | | 713/166 |
| 9,485,262 B1* | 11/2016 | Kahn | H04L 63/1416 |
| 9,853,992 B1* | 12/2017 | Kumar | H04L 63/1433 |
| 10,291,638 B1* | 5/2019 | Chandana | G06F 7/24 |
| 2006/0058854 A1* | 3/2006 | Abrams | A61N 1/36021 |
| | | | 607/45 |
| 2008/0148398 A1* | 6/2008 | Mezack | G06F 21/55 |
| | | | 726/22 |
| 2012/0224057 A1* | 9/2012 | Gill | G06F 21/55 |
| | | | 348/143 |
| 2014/0215618 A1* | 7/2014 | Striem Amit | G06F 21/55 |
| | | | 726/23 |

* cited by examiner

*Primary Examiner* — Abu S Sholeman
(74) *Attorney, Agent, or Firm* — Van Pelt, Yi & James LLP

(57) ABSTRACT

Activity specifications of a plurality of activities to be monitored are received. Each activity specification of the activity specifications identifies properties of a corresponding activity of the activities to be monitored. A fingerprint specification of a computer security risk fingerprint is received. The fingerprint specification identifies a combination of two or more of the activities to be detected. A log of activities to identify occurrences of the activities to be monitored is analyzed. Based on the analysis, the computer security risk fingerprint in the log of activities is detected, including by detecting an occurrence of at least a portion of the combination of the activities identified by the fingerprint specification. A computer security action based on the detection of the computer security risk fingerprint is performed.

20 Claims, 7 Drawing Sheets

BEHAVIORAL AND ACCOUNT FINGERPRINTING

BACKGROUND OF THE INVENTION

In order to improve security, online software services monitor activities performed on behalf of their users to help identify fraudulent behavior. Each of the monitored activities may be logged for later security review and to trigger a security action such as disabling an account. In some scenarios, a common fraudulent behavior may be associated with a particular activity, a collection of activities, or an ordered sequence of activities. For example, a fraudulent payment may be associated with changing an administrator password of an account, adding a new form of payment, and then purchasing an advertisement. Traditionally, service operators may utilize tools to identify fraudulent behaviors by piecing together different activities and the time they each occurred. Due to the complexity in the number and occurrences of the monitored activities, the process is tedious and may be difficult to extrapolate more general results. Therefore, a need exists to identify a fingerprint from monitored activities that can be associated with and help identify past and future fraudulent behavior.

BRIEF DESCRIPTION OF THE DRAWINGS

Various embodiments of the invention are disclosed in the following detailed description and the accompanying drawings.

DETAILED DESCRIPTION

Figure 1:
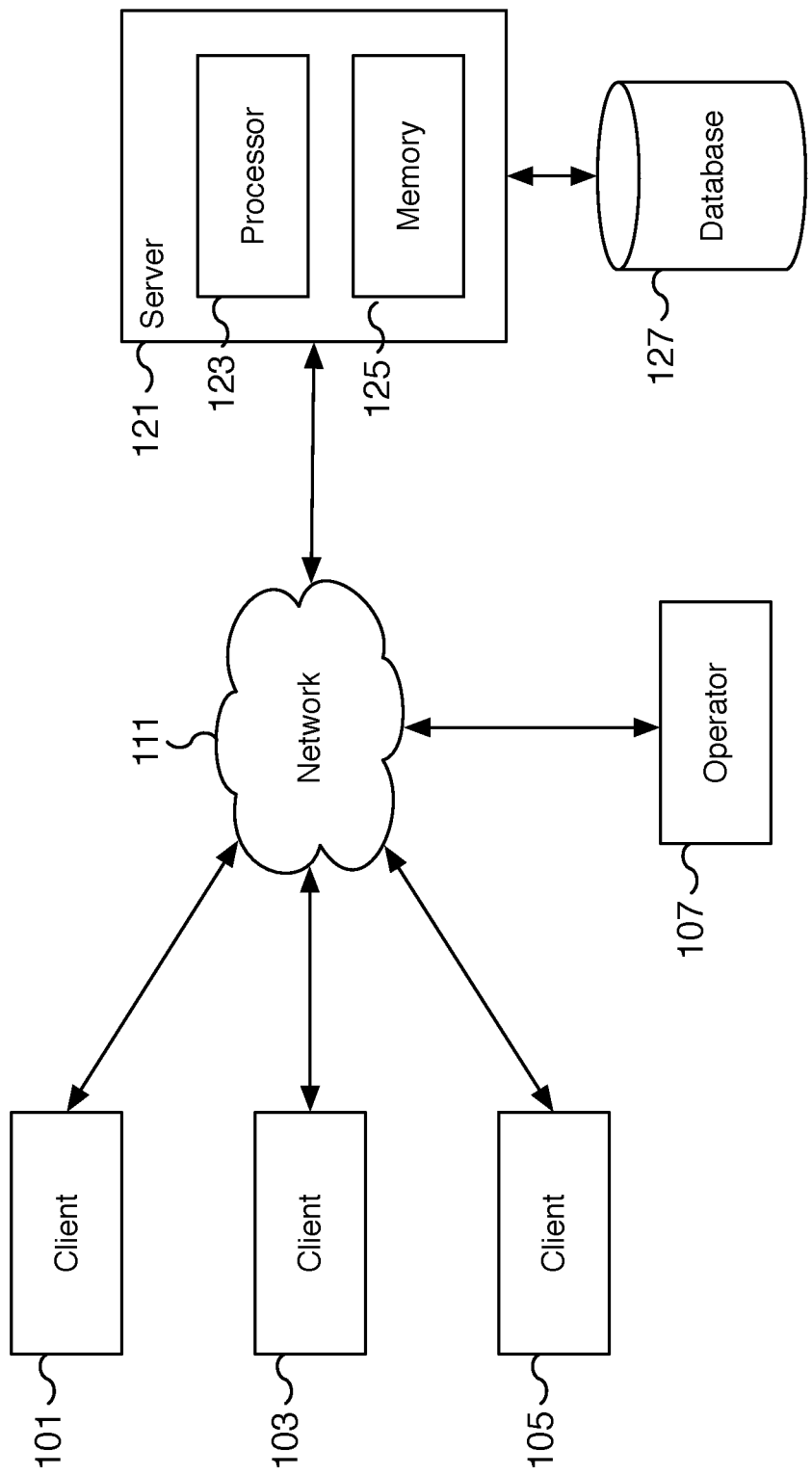
FIG. 1 is a block diagram illustrating an example of a software service environment for performing behavioral and account fingerprinting.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The detection of computer security risk fingerprints of user interactions with a software service is disclosed. For example, a software service, such as a social networking site, provides access to clients. Users interact with the software service in a variety of ways, for example, creating an account, adding friends or contacts, sharing posts, sharing photos, making online payments, and purchasing and interacting with advertisements. A subset of the user activity is identified and monitored to identify potential fraudulent behavior. For example, an activity related to changing a password, changing contact information, or adding new payment information may be monitored and logged in persistent storage. Each activity that is monitored is associated with properties for the activity such as an activity type identifier and a time value for the activity. The time value may correspond to the time the activity was initiated, completed, or another appropriate time for the activity. In some embodiments, an activity's properties include a source for retrieving the time value for the activity. A computer security risk fingerprint identifies activities that in combination represent a behavior that creates a potential computer security risk. A computer security risk fingerprint is determined in part by specifying a fingerprint specification. For example, a fingerprint specification may include a set of activities and/or properties of activities from the monitored activities to be detected. The logged activities are analyzed to identify occurrences of the monitored activities and the existence of computer security risk fingerprints. For example, based on the analysis, a computer security risk fingerprint is detected in an activities log for each occurrence of the activities specified by the fingerprint specification. In some embodiments, a computer security action based on detecting the computer security risk fingerprint is performed. For example, an alert for similar fingerprints may be created, an account may be disabled or placed under heightened security review, or payment methods may be disabled.

In some embodiments, a plurality of activities is monitored. For example, for certain activities, such as each time a user logs into an account, a user adds a new page, a new page is created, a password is changed, a login is suspicious, a credit card is added to an account, or a new advertisement is shared, the activity is logged into a database log. In various embodiments, different activities and activity types may be monitored. Activity specifications of the monitored activities are received and each activity specification identifies properties of corresponding monitored activities. For example, an activity specification may specify properties such as an activity type and a context for the activity that correspond to the monitored activities. Examples of activity types include an activity corresponding to a user adding a new page, a password change, a suspicious login, an unvetted login, a suspicious login, and a credit card added to payment information. Examples of activity contexts include activities in the context of an advertisement page, an advertisement market, or a user. For example, a suspicious login may be associated in the context of an advertisement page or a user account depending on the properties specified by the activity specification. A fingerprint specification of a computer security risk fingerprint is received. The fingerprint specification identifies a combination of two or more of the activities to be detected. For example, the fingerprint specification may identify a set of activities, such as an account removing a user, a user email change, a user phone number change, and a new user added to an account, to be detected. Using a processor, the log of activities is analyzed to identify occurrences of the monitored activities. For example, a database log storing logged activities is analyzed to identify the monitored activities, such as identifying the activity type. Based on the analysis, the computer security risk fingerprint is detected in the log of activities, including by detecting an occurrence of at least a portion of the combination of the activities specified by the fingerprint specification. Using the previous computer security risk fingerprint example, a computer security risk fingerprint is detected in the event at least a portion of the activities, such as the activities corresponding to an account removing a user, a user email change, a user phone number change, and a new user added to an account, is detected in the database log. As another example, a computer security risk fingerprint corresponding to a combination of activities such as an account removing a user, a user email change, a user phone number change, and a new user added to an account is detected in response to those activities occurring in combination in the activities log. A computer security action based on the detection of the computer security risk fingerprint is performed. For example, an account may be disabled, an alert may be created in the event a similar fingerprint is detected, or a page may be disabled.

FIG. 1 is a block diagram illustrating an example of a software service environment for performing behavioral and account fingerprinting. In the example shown, clients 101, 103, and 105 are network clients for accessing online software services provided by server 121. Examples of network computing devices include but are not limited to a smartphone device, a desktop computer, a tablet, a laptop, a smart TV, a virtual reality headset, and a gaming console. Examples of activities performed by clients 101, 103, and 105 include logging into the service, creating a new page, creating an advertisement, sending a payment to another user, listing a product for sale, and purchasing a product or service, among others. Operator 107 is a network client accessing online software services via server 121 as a network operator and/or administrator. Typically, operator 107 is an employee or representative of the software service whose purpose includes configuring and/or monitoring the security of the software service offered by server 121. Operator 107 may initiate the detection of and analysis for account and behavioral fingerprints on the activities on clients such as clients 101, 103, and 105.

In the example shown, clients 101, 103, and 105 and operator 107 connect to server 121 via network 111. Examples of network 111 include one or more of the following: a mobile communication network, the Internet, a direct or indirect physical communication connection, a Wide Area Network, a Storage Area Network, and any other form of connecting two or more systems, components, or storage devices together. Server 121 uses processor 123 and memory 125 to process and respond to requests from clients 101, 103, and 105 and operator 107. Server 121 also uses processor 123 and memory 125 to monitor and log client activities and to perform behavioral and account fingerprinting. In some embodiments, activities of clients 101, 103, and 105 are logged in a data store such as database 127. In some embodiments, activity and fingerprint specifications are stored in a data store such as database 127.

In various embodiments, operator 107 accesses server 121 to perform account and behavioral fingerprinting. For example, operator 107 may securely log into server 121 to detect account and behavior fingerprints based on the activities of clients 101, 103, and 105. In some embodiments, server 121 monitors the activities of clients 101, 103, and 105 and detects fraudulent account and behavioral fingerprints. For example, server 121 may detect a computer security risk fingerprint associated with fraudulent behavior and initiate an alert to operator 107, deactivate an account and/or advertisement associated with the computer security risk fingerprint, and/or perform another appropriate computer security action.

In some embodiments, operator 107 provides to server 121 activity specifications of the activities to be monitored. The activity specifications identify particular activities and the context associated with the activity. Operator 107 provides to server 121 a fingerprint specification identifying particular activities to be detected from the monitored and logged activities. Server 121 analyzes the log of activities, which may be stored on a database such as database 127, to identify the activities that are monitored and to detect the computer security risk fingerprint detailed by the fingerprint specification. Based on the detection of the computer security risk fingerprint, server 121 performs a computer security action. In some embodiments, activity specifications and/or fingerprint specifications are provided by a different user other than operator 107, such as a programmer or security analyst. The specifications may also be identified and provided via a software program, an application programming interface (API), a web-based application, or by another appropriate interface. In some embodiments, operator 107 initiates and/or reviews the analysis of the fingerprint detection, which may be configured by one or more other operators. In various embodiments, operator 107 may initiate and perform additional computer security actions based on detected computer security risk fingerprints. For example, a fraudulent behavioral fingerprint may be detected and operator 107 may initiate a search for the same fingerprint against the activities of additional users.

In various embodiments, the components shown in FIG. 1 may exist in various combinations of hardware machines. Although single instances of components have been shown to simplify the diagram, additional instances of any of the components shown in FIG. 1 may exist. For example, server 121 may include one or more servers providing a software service, monitoring client activities, and performing account and behavioral fingerprinting. In some embodiments, the functionality of server 121 is performed by one or more virtualized servers. The online software services and the security fingerprinting analysis may, for example, be accessed via different servers, such as via different addresses and/or ports, and the functionality may be split across and/or between different machines. In various embodiments, the software services and the security fingerprinting analysis are not accessible from the same servers or from the same locations. For example, in some embodiments, the fingerprint analysis is not accessible over the public Internet and may only be accessible from a secure location such as a location inside the network of server 121 or via a virtual private network. In various embodiments, components not shown in FIG. 1 may also exist.

Figure 2:
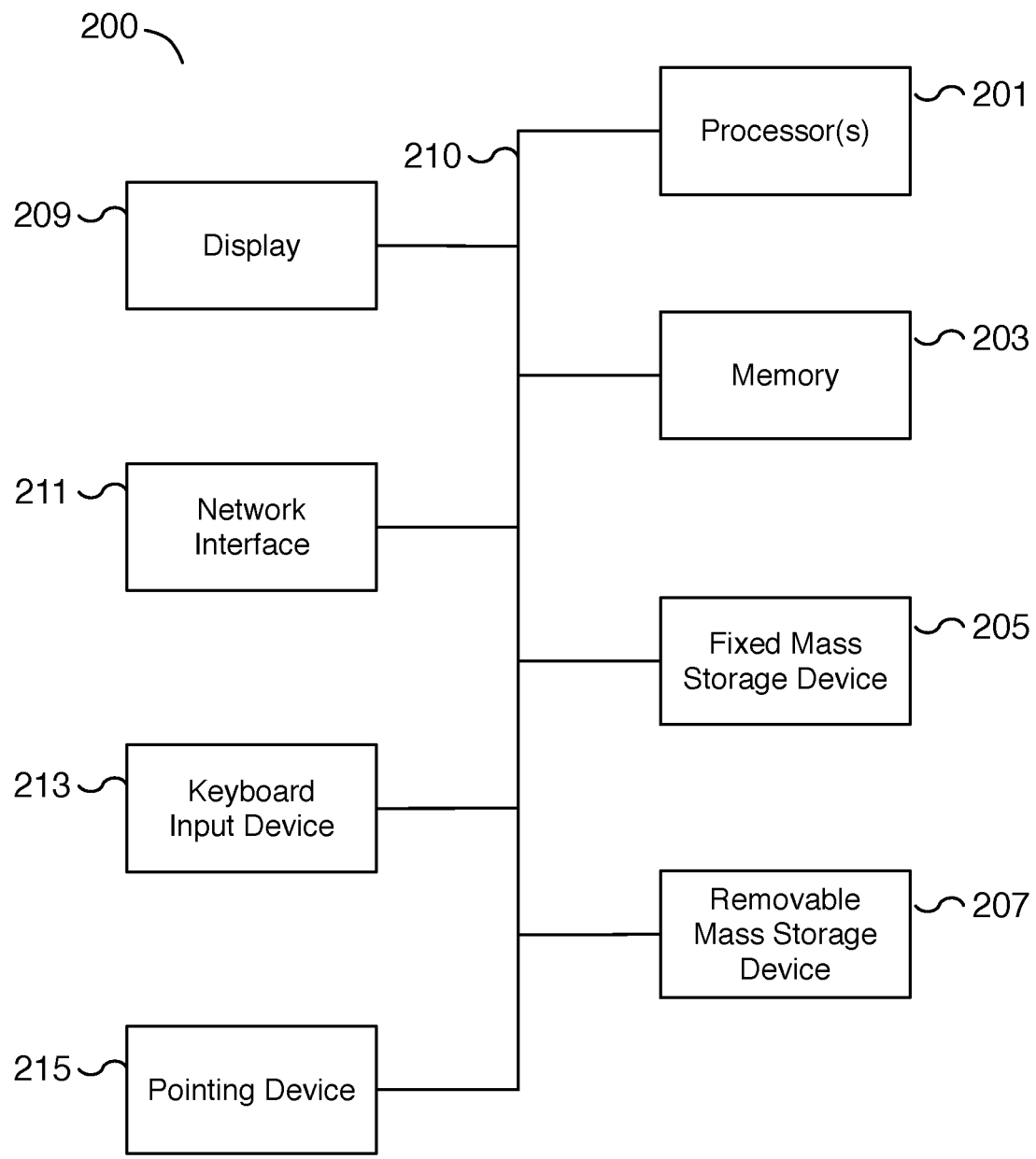
FIG. 2 is a functional diagram illustrating a programmed computer system for performing behavioral and account fingerprinting.

FIG. 2 is a functional diagram illustrating a programmed computer system for performing behavioral and account fingerprinting. As will be apparent, other computer system architectures and configurations can be used to perform behavioral and account fingerprinting. In some embodiments, computer system 200 is a virtualized computer system providing the functionality of a physical computer system. Computer system 200, which includes various subsystems as described below, includes at least one microprocessor subsystem (also referred to as a processor or a central processing unit (CPU)) 201. For example, processor 201 can be implemented by a single-chip processor or by multiple processors. In some embodiments, processor 201 is a general purpose digital processor that controls the operation of the computer system 200. Using instructions retrieved from memory 203, the processor 201 controls the reception and manipulation of input data, and the output and display of data on output devices (e.g., display 209). In some embodiments, processor 201 includes and/or is used to provide functionality for monitoring client activities and performing behavioral and account fingerprinting. In some embodiments, computer system 200 is used to provide element 121, processor 201 is used to provide element 123, and memory 203 is used to provide element 125 of FIG. 1. In some embodiments, processor 201 performs the processes described below with respect to FIGS. 3-7.

Processor 201 is coupled bi-directionally with memory 203, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 201. Also as is well known in the art, primary storage typically includes basic operating instructions, program code, data, and objects used by the processor 201 to perform its functions (e.g., programmed instructions). For example, memory 203 can include any suitable computer-readable storage media, described below, depending on whether, for example, data access needs to be bi-directional or uni-directional. For example, processor 201 can also directly and very rapidly retrieve and store frequently needed data in a cache memory (not shown).

A removable mass storage device 207 provides additional data storage capacity for the computer system 200, and is coupled either bi-directionally (read/write) or uni-directionally (read only) to processor 201. For example, storage 207 can also include computer-readable media such as flash memory, portable mass storage devices, magnetic tape, PC-CARDS, holographic storage devices, and other storage devices. A fixed mass storage 205 can also, for example, provide additional data storage capacity. Common examples of mass storage 205 include flash memory, a hard disk drive, and an SSD drive. Mass storages 205, 207 generally store additional programming instructions, data, and the like that typically are not in active use by the processor 201. Mass storages 205, 207 may also be used to store user-generated content and digital media for use by computer system 200.

It will be appreciated that the information retained within mass storages 205 and 207 can be incorporated, if needed, in standard fashion as part of memory 203 (e.g., RAM) as virtual memory.

In addition to providing processor 201 access to storage subsystems, bus 210 can also be used to provide access to other subsystems and devices. As shown, these can include a display 209, a network interface 211, a keyboard input device 213, and pointing device 215, as well as an auxiliary input/output device interface, a sound card, speakers, additional pointing devices, and other subsystems as needed. For example, the pointing device 215 can be a mouse, stylus, track ball, or tablet, and is useful for interacting with a graphical user interface.

The network interface 211 allows processor 201 to be coupled to another computer, computer network, or telecommunications network using one or more network connections as shown. For example, through the network interface 211, the processor 201 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 201 can be used to connect the computer system 200 to an external network and transfer data according to standard protocols. For example, various process embodiments disclosed herein can be executed on processor 201, or can be performed across a network such as the Internet, intranet networks, or local area networks, in conjunction with a remote processor that shares a portion of the processing. Additional mass storage devices (not shown) can also be connected to processor 201 through network interface 211.

An auxiliary I/O device interface (not shown) can be used in conjunction with computer system 200. The auxiliary I/O device interface can include general and customized interfaces that allow the processor 201 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above and magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In addition, bus 210 is illustrative of any interconnection scheme serving to link the subsystems. Other computer architectures having different configurations of subsystems can also be utilized.

Figure 3:
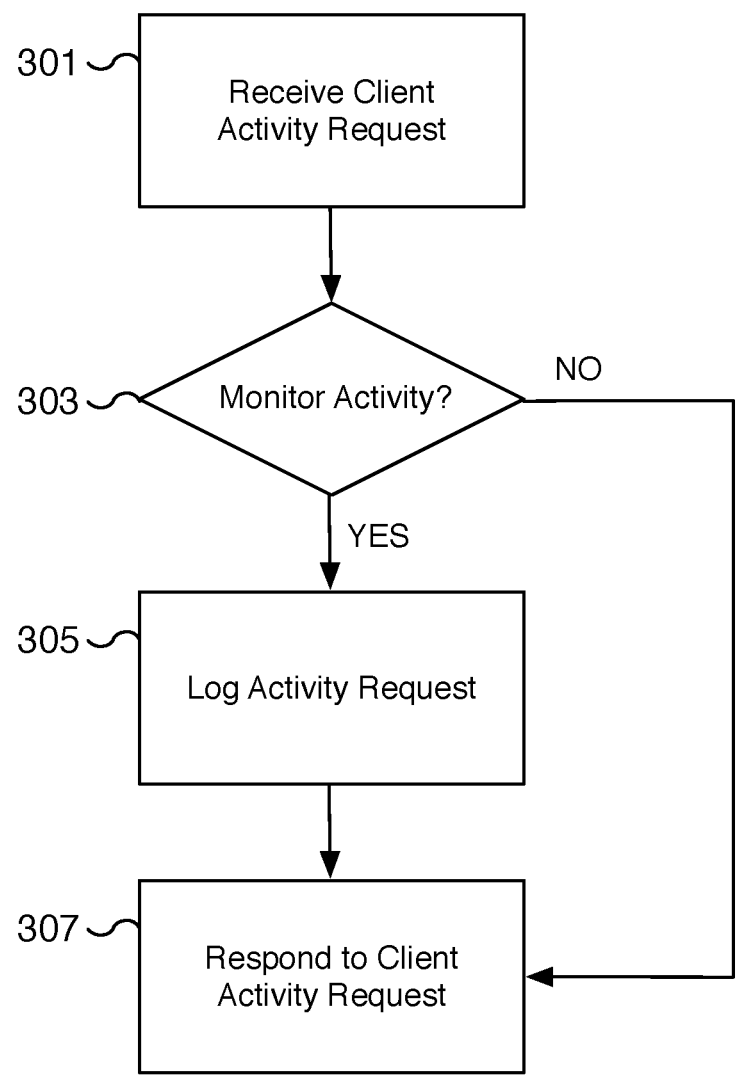
FIG. 3 is a flow diagram illustrating an embodiment of a process for monitoring client activities.

FIG. 3 is a flow diagram illustrating an embodiment of a process for monitoring client activities. As clients interact with a software service, one or more of the activities of the clients are monitored. In various embodiments, the process of monitoring activities includes logging the monitored activities for later use, such as retrieval, searching, and analysis. The specific activities that are monitored may be configured for the system. For computer security risk fingerprint detection, the activities monitored include activities associated with the security of the system. Activities include interactions such as adding a user to an account, removing a user from an account, adding an administrator to a page, removing an administrator from a page, modifying payment information, modifying a password, or failing a login. Additional activities include examples such as creating an account, logging into an account, adding new content to an account for sharing, adding an advertisement page, adding payment information to an account, changing a phone number for an account, and adding a new contact to an account. As new activities are associated with a fraudulent behavior or behavior that is desirable for monitoring, new activities may be added to the set of monitored activities. Once monitored, a combination of the monitored activities may be utilized to detect computer security risk fingerprints. In various embodiments, activities may include peer-to-peer payment activities, online gaming activities, activities related to an advertisement market, and activities related to advertised pages. In some embodiments, the process of FIG. 3 is performed by server 121 of FIG. 1 to monitor activities of clients such as clients 101, 103, and 105 of FIG. 1. In some embodiments, operator 107 of FIG. 1 configures the monitoring of the activities for the service run by server 121 of FIG. 1.

In the example shown, at 301, the server receives a client activity request. For example, a client requests to change his or her password. As another example, the server receives a request from a client to expand a comment dialog box to display additional comments. At 303, a determination is made whether the activity is a monitored activity. In response to a monitored activity, processing continues to 305. In response to an activity that is not monitored, processing continues to 307. For example, in the scenario that a user password change activity is one of the monitored activity types, processing continues to 305 where the activity is logged. As another example, in the scenario that an activity corresponding to a user request to expand a comment dialog box is not monitored, then in response to that particular activity, processing continues to 307 and the activity is not monitored or logged. In some embodiments, monitored activities are determined based on an activity type identifier. In some embodiments, the activity context may be used to determine whether an activity is monitored. In various embodiments, additional properties of the incoming activity requests, such as the IP address, the country, the user history, or other query parameters may be configured to determine whether an activity is monitored.

At 305, the server logs the activity request corresponding to a monitored activity. In the example above, the activity request from a user to change his or her password is monitored and subsequently logged at 305. In some embodiments, the logging includes logging activity information such as the user or initiator of the activity, an activity identifier or type, an activity context, an activity time, and/or a source for the activity time. In some embodiments, the logging includes request information such as the IP address and country of the request. In some embodiments, an activity identifier may be a short name for the activity. In some embodiments, an activity identifier may be a unique trigram such as PWD for a password change or UPA for a user added to a page. In various embodiments, an activity context is the context from which the activity arises. For example, various contexts may include a user context, an advertisement market context, an advertised page context, and a marketplace context. In some embodiments, an activity time value is associated with the logged activity. The time may be the initial time of the client request, the time the request was responded to, or another appropriate time value. For example, for an email activity request, the time associated with the activity may be the time the email was sent, the time the email was received, or the time associated with the response to the email. In some embodiments, more than one time value is associated with an activity. For example, the start and end time may be associated with a long running activity. In some embodiments, an activity is split into one or more activities, each with their own associated time value. In various embodiments, a time source for an activity may be an optional resource for determining the time value(s) to associate with an activity. For example, for certain activities, an external or remote server or database may be accessed to determine the time value to associate with the activity. In various embodiments, one or more activity information associated with the monitored activity are logged. The logged activities may be later searched and analyzed to detect computer security risk fingerprints. In some embodiments, the activities are logged in a database such as database 127 of FIG. 1.

At 307, the server responds to the client activity request. For example, once an activity is logged or not logged, the server will respond to the request. A typical response to an activity request is to fulfill the request associated with the activity. For example, for a user change password activity, the server continues processing to fulfill the request. In some embodiments, the password is changed, a confirmation to change the password is required, the original password is requested prior to initiating the change, or any other appropriate response to the activity is performed.

Figure 4:
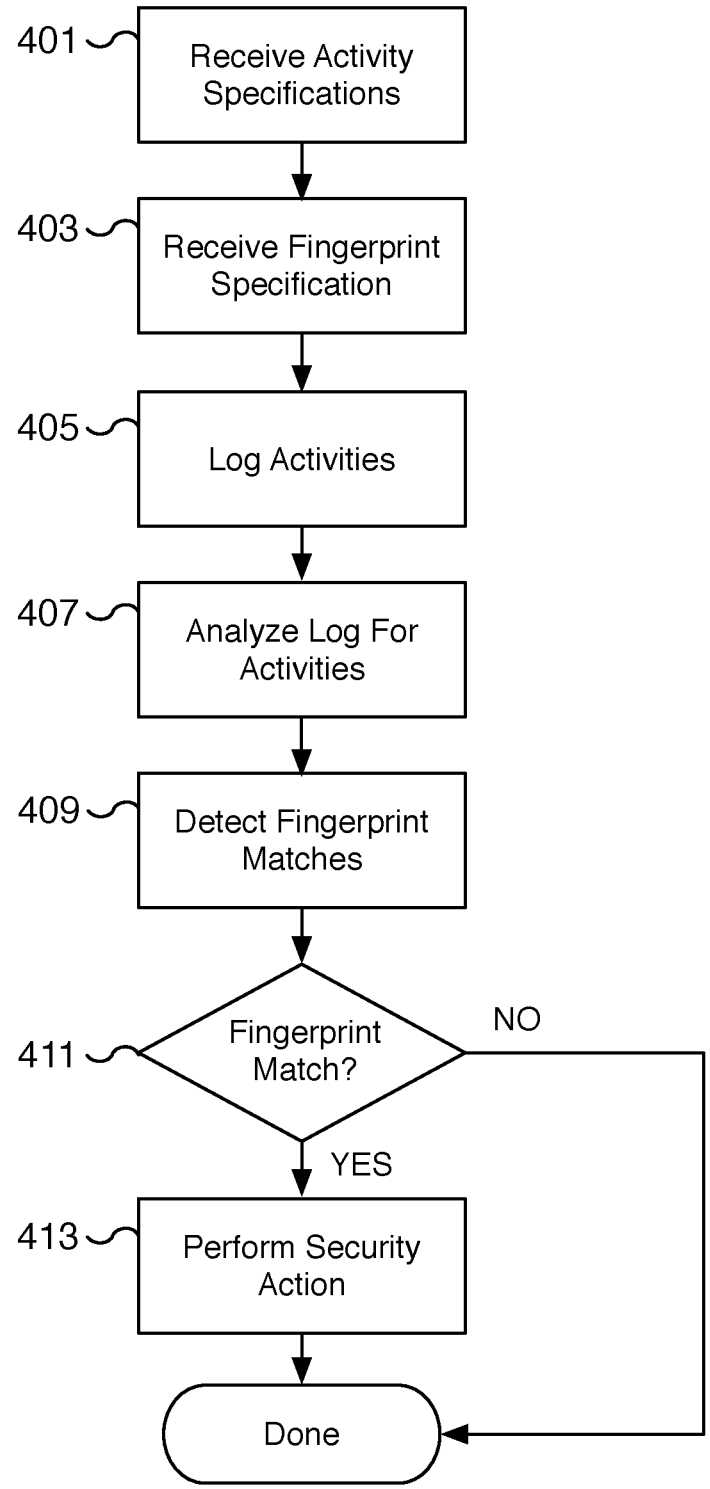
FIG. 4 is a flow diagram illustrating an embodiment of a process for performing behavioral and account fingerprinting.

FIG. 4 is a flow diagram illustrating an embodiment of a process for performing behavioral and account fingerprinting. Utilizing a log of monitored activities, the process of FIG. 4 detects computer security risk fingerprints among activities and performs a computer security action based on a fingerprint match. In some embodiments, the process of FIG. 4 is performed by server 121 of FIG. 1 to detect computer security risk fingerprints from activities of clients such as clients 101, 103, and 105 of FIG. 1. In some embodiments, operator 107 of FIG. 1 interfaces with server 121 of FIG. 1 to initiate the process of FIG. 4.

In the example shown, at 401, activity specifications are received. For example, an activity specification describing an activity is received and includes information on the activity such as activity identifier or type, an activity context, and/or a source for the activity time. At 401, one or more activity specifications are received corresponding to one or more activity types. The activity specifications may be utilized to identify activities from the monitored activities. In some embodiments, the activity identifier is a unique identifier for the activity type. For example, the activity identifier can be a name for the activity type. As another example, an activity identifier can be a unique trigram to identify the activity type. Examples of trigrams include PWD (for the activity corresponding to a password change), UPA (for the activity corresponding to a user adding a page), SPL (for the activity corresponding to a suspicious login), and CCA (for the activity corresponding to adding a credit card). In some embodiments, additional activities may be added, monitored, and detected by adding additional activity specifications. In some embodiments, a new trigram is utilized to identify each new activity. In some embodiments, the letters of the trigram are selected to correspond to an abbreviation or shortened version of the activity. In various embodiments, a different form of a unique identifier other than a trigram may be utilized.

In various embodiments, an activity context describes the context associated with the activity. An activity context may be utilized to distinguish two similar activities from one another. For example, adding new content, such as a comment or a post, in the context of a user page may be distinguished from adding new content to an advertised page. In various embodiments, the context may include a user context, an advertisement market context, an advertised page context, and/or a marketplace context. In some embodiments, the context may include the context of a peer-to-peer payment or in the context of online gaming. For example, a payment from one individual user to another individual user (i.e., in the context of a peer-to-peer payment), a gaming user (i.e., in the context of online gaming), or a business (i.e., in the context of a business to consumer relationship) may be distinguished by an activity context. In some embodiments, the activity specification includes a time data source for retrieving the identification of a time value. For example, an activity specification may identify a remote service, such as a remote database or a remote server, for retrieving the time value to associate for an activity. In some embodiments, a time data source is an optional specification and the time of the activity is recorded at the time the activity is observed by the monitoring service.

At 403, a fingerprint specification is received. Each fingerprint specification corresponds to one or more computer security risk fingerprints. In some embodiments, the fingerprint specification identifies a list of activities to be utilized by the computer security risk fingerprint analysis. □For example, a fingerprint analysis may utilize a fingerprint specification that includes only activities with a user context. As another example, a fingerprint analysis may utilize a fingerprint specification that includes all computer security risk related activities. As an additional example, a fingerprint analysis may utilize a fingerprint specification that includes only user activities associated with peer-to-peer payments. In some embodiments, all monitored activities are specified using a fingerprint specification and only subsequently are activities filtered using additional filtering or search query mechanisms.

At 405, activities are logged. For example, the monitored activities are logged into a database with the relevant information of the activities, such as the source and/or context of the activity and a time to associate with the activity. In some embodiments, the logged activity utilizes a time source to retrieve the time value to associate with the logged activity. In some embodiments, the time value associated with the activity is not retrieved at logging but at a later time such as when the activities are analyzed for time data. In some embodiments, additional information related to the activity is logged, such as the user who initiated the activity, the IP address of the activity, the country associated with the activity, and other related activity information.

At 407, the monitored activities log is analyzed. For example, the activities monitored and logged at 405 are analyzed at 407. In some embodiments, properties and relevant data associated with each logged activity are retrieved and associated in an activity object or data structure. In various embodiments, the time values are retrieved for each relevant activity. For example, in the event the activity utilizes a time source for the time value, the time value is retrieved from the time source. In some embodiments, the analysis of the logged activities associates a captured time value with each logged activity. For example, the analysis associates a time value in the event a time exists for an activity or retrieves a time value in the event the activity utilizes a time source. In some embodiments, the result of the activities log analysis is a group of activities each with a time associated with the activity. As one example, the analysis associates the time value 3:14:03 UTC Jun. 8, 2017 with a credit card added to a user account activity, the time value 5:23:33 UTC Apr. 12, 2017 with an unvetted login activity, and the time value 13:36:10 UTC May 18, 2017 with a password change activity based on the monitored activities: a credit card added to a user account activity, an unvetted login activity, and a password change activity.

At 409, one or more computer security risk fingerprints are detected. In some embodiments, the analyzed activities with associated time values are grouped and sorted by time values to create a concatenated computer security risk fingerprint. Based on the example analysis at 407 associating the time value 3:14:03 UTC Jun. 8, 2017 with a credit card added to a user account activity, the time value 5:23:33 UTC Apr. 12, 2017 with an unvetted login activity, and the time value 13:36:10 UTC May 18, 2017 with a password change activity, a fingerprint is detected based on a time value ordered sequence of the activities: an unvetted login activity followed by a password change activity followed by a credit card added to a user account activity. In some embodiments, a different metric other than ordered time values is used to detect a computer security risk fingerprint. For example, the existence of a particular activity and/or context is used to detect a computer security risk fingerprint. In some embodiments, a computer security risk fingerprint may be detected based on time restrictions between two or more activities. For example, a time restriction may restrict the maximum time between the occurrences of any two or more activities. In some embodiments, a computer security risk fingerprint may be detected based on the relative time values associated with activities. For example, a computer security risk fingerprint may be detected based on the existence of any activity that occurs within one week from a suspicious login activity. In some embodiments, a computer security risk fingerprint may be detected based on the occurrence of any activity (e.g., a failed login activity or an unvetted login activity) or the ordered sequence of activities (e.g., an unvetted login activity followed by a password change activity).

In some embodiments, a trigram is associated with each activity and used to identify and distinguish one activity type from another. For example, the trigram CCP may be utilized for a credit card added to a user account activity, UVL for an unvetted login activity, and PWD for a password change activity. In various embodiments, computer security risk fingerprints may be identified by the concatenated activities. For example, the computer security risk fingerprint UVL:PWC:CCP identifies the fingerprint with the activities: an unvetted login activity followed by a password change activity followed by a credit card added to a user account activity.

At 411, in response to a computer security risk fingerprint match, processing continues to 413. At 411, in response to no computer security risk fingerprint match, processing completes. For example, in some scenarios, no computer security risk fingerprints match the fingerprint specification and processing completes.

At 413, a computer security action is performed in response to a computer security risk fingerprint match. In some embodiments, a security action includes disabling an account, disabling a credit card, disabling an advertisement, setting up a monitoring service, or creating an alert. For example, in response to computer security risk fingerprints matching to a behavior associated with a fraudulent credit card user, a security action corresponding to disabling a credit card may be performed. In some embodiments, a security action includes displaying photo identification, an IP address, and/or a country associated with the computer security risk fingerprint. For example, in response to a computer security risk fingerprint matching to detected fraudulent behavior, a photo of the logged in user, the user's IP address, and the user's country are displayed in a security monitoring user interface.

Figure 5:
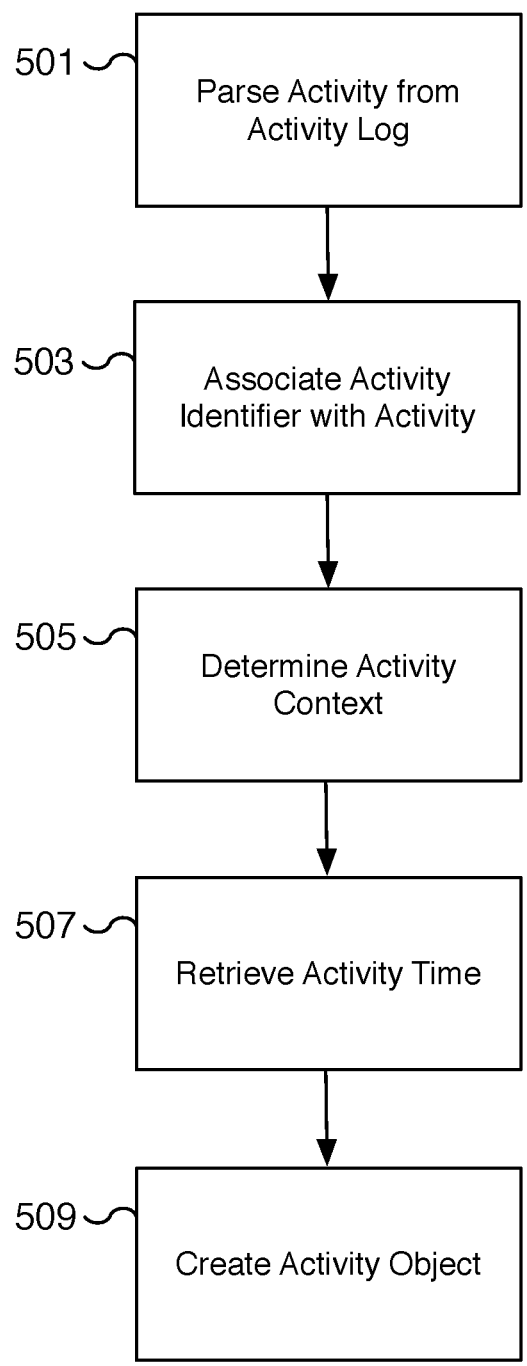
FIG. 5 is a flow diagram illustrating an embodiment of a process for analyzing computer security risk activities.

FIG. 5 is a flow diagram illustrating an embodiment of a process for analyzing computer security risk activities. In various embodiments, the process of FIG. 5 is used to analyze the monitored activities that are used to eventually detect a computer security risk fingerprint. In some embodiments, the process of FIG. 5 is performed by server 121 of FIG. 1 to analyze monitored activities of clients such as clients 101, 103, and 105 of FIG. 1. In some embodiments, the process of FIG. 5 is performed at 407 of FIG. 4, 605 of FIG. 6, and 703 of FIG. 7 to analyze a log for activities.

At 501, an activity log is parsed for monitored activities. For example, the monitored activities are recorded to a log, such as a database or a file. At 501, the log is processed and the activity entries are parsed.

At 503, each parsed activity is associated with an activity identifier. In various embodiments, each activity type has a unique type identifier. For example, a change password activity is associated with a change password activity identifier. In some embodiments, the activity identifier is a number. In some embodiments, the activity identifier is a trigram. In some embodiments, the activity identifier is a unique name. In some embodiments, each activity and context has a unique identifier.

At 505, the activity context of each parsed activity is determined. For example, various contexts may include a user context, an advertisement market context, an advertised page context, and a marketplace context. In some embodiments, the context may include the context of a peer-to-peer payment or the context of online gaming. For example, a password change may be in the context of a user account, a user gaming account, an advertised page account, or other appropriate account with a password. As another example, activities associated with an advertised page are activities in the context of an advertised page and not in the context of a user account.

At 507, the activity time value is retrieved. For example, the captured time value associated with the parsed activity is retrieved and associated with the activity. As one example, the time 5:23:33 UTC Apr. 12, 2017 is associated with an unvetted login activity that is monitored to have occurred at 5:23:33 UTC Apr. 12, 2017. In some embodiments, the activity does not have a logged captured time value but instead has a time data source for the time value. In response to a time data source, the time value is retrieved from the time data source and then associated with the activity. The time data source may be a remote server, a remote database, or other similar data source. In some embodiments, the time value is retrieved from a time data source using an Application Programming Interface (API) or a remote procedure call. In various embodiments, the time value is stored to the nearest second or at a finer granularity. In some embodiments, the time value is a time value based on the number of seconds that have elapsed since a specific time. For example, in some embodiments, the time value may be stored as Unix or epoch time. In some embodiments, an activity may have more than one time value associated with the activity. For example, an activity may have a start and an end time value.

At 509, an activity object is created for the parsed activity with the appropriate context and time value. In some embodiments, an object or data structure representing each parsed activity is created. In various embodiments, the activity objects created at 509 are later used to detect computer security risk fingerprints that match the fingerprint specification. In some embodiments, activity objects are only created for activities that are within the fingerprint specification. In various embodiments, the activity objects are created utilizing the corresponding activity specification.

Figure 6:
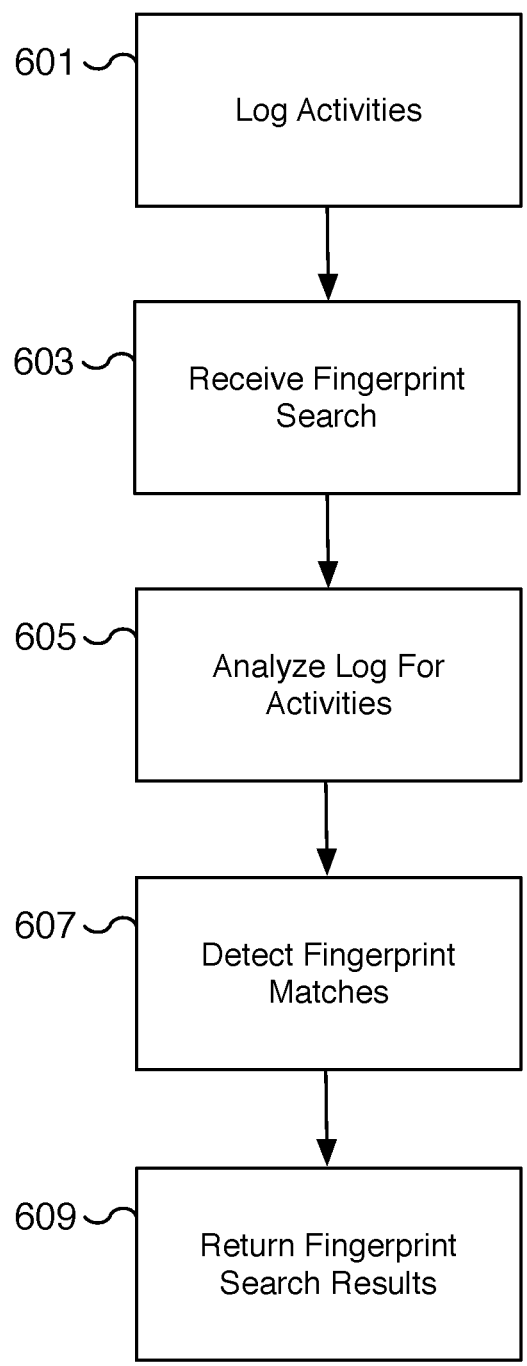
FIG. 6 is a flow diagram illustrating an embodiment of a process for performing behavioral and account fingerprinting.

FIG. 6 is a flow diagram illustrating an embodiment of a process for performing behavioral and account fingerprinting. In various embodiments, the process of FIG. 6 is used to search for a computer security risk fingerprint against monitored activities. For example, once a fingerprint identifying fraudulent behavior is detected from the activities of a malicious user, the same fingerprint can be used to identify the same pattern of behavior performed by the same user or other users. An operator, such as operator 107 of FIG. 1, may initiate a search for a particular fingerprint pattern against monitored activities to detect computer security risk fingerprint matches. As another example, client activities can be continuously monitored for computer security risk fingerprints and a computer security action is performed in response to a match. For example, when an activity triggers a computer security risk fingerprint match by, for example, completing an ordered sequence of activities, a security alert can be issued. Another example of a security action includes denying a potentially fraudulent action from completing. In some embodiments, the process of FIG. 6 is performed by server 121 of FIG. 1 by analyzing the monitored activities of clients such as clients 101, 103, and 105 of FIG. 1 for a match to a fingerprint search.

At 601, activities are logged. For example, activities from clients to a software service are monitored and logged. At 603, a fingerprint search query is received. For example, an operator may initiate or configure a fingerprint search. In some embodiments, the fingerprint search query includes identifying the fingerprint using a combination of the activity identifiers. For example, the computer security risk fingerprint UVL:PWC:CCP identifies the fingerprint with the activities: an unvetted login activity followed by a password change activity followed by a credit card added to a user account activity, and may be included as a parameter for a fingerprint search. In some embodiments, the fingerprint search does not include a complete fingerprint but only a partial description of a computer security risk fingerprint, such as the occurrence of one or more activities in combination. For example, a computer security risk fingerprint search may detect a fingerprint based on the occurrence of any activity (e.g., a failed login activity or an unvetted login activity) or the ordered sequence of activities (e.g., an unvetted login activity followed by a password change activity). In some embodiments, the fingerprint search includes a context requirement. For example, the fingerprint search may require that the context associated with the activities is limited to an advertised page.

In some embodiments, the computer security risk fingerprint search includes parameters for time restrictions between two or more activities. For example, a time restriction may restrict the maximum time between the occurrences of any two or more activities. In some embodiments, a computer security risk fingerprint may be matched based on the relative time values associated with activities. For example, a computer security risk fingerprint may be detected and matched based on the existence of any activity that occurs within one week from a suspicious login activity.

At 605, the monitored activities log is analyzed. For example, the activities monitored and logged at 601 are analyzed at 605. In some embodiments, properties and relevant data associated with each logged activity are retrieved and associated in an activity object or data structure. In various embodiments, the time values are retrieved for each relevant activity. For example, in the event the activity utilizes a time source for the time value, the time value is retrieved from the time source. In some embodiments, the analysis of the logged activities associates a captured time value with each logged activity. For example, the analysis associates a time value in the event a time exists for an activity or retrieves a time value in the event the activity utilizes a time source. In some embodiments, the result of the activities log analysis is a group of activities each with a time associated with the activity. As one example, the analysis associates the time value 3:14:03 UTC Jun. 8, 2017 with a credit card added to a user account activity, the time value 5:23:33 UTC Apr. 12, 2017 with an unvetted login activity, and the time value 13:36:10 UTC May 18, 2017 with a password change activity based on the monitored activities: a credit card added to a user account activity, an unvetted login activity, and a password change activity.

At 607, fingerprints that match the computer security risk fingerprint search received at 603 are detected. In some embodiments, the analyzed activities with associated time values are grouped, sorted by time values, and concatenated to create a fingerprint that is compared to the computer security risk fingerprint search query parameters. As described above, the fingerprint search may be based on different search parameters such as a complete fingerprint, a partial fingerprint, context requirements, time value restraints, and/or any other appropriate search parameters based on the activity and/or fingerprint properties. In various embodiments, at 607, fingerprints are detected based on the monitored activities and matched with the fingerprint search to create computer security risk fingerprint search results.

At 609, computer security risk fingerprint search results are returned. For example, in the event an operator initiates the search, the computer security risk fingerprint search results may be provided to the operator in the form of a graphical user interface. In some embodiments, the search results are used to perform a computer security action such as displaying the user account information of the user whose fingerprint matches the search. In some embodiments, the display includes the user's IP address and country. In some embodiments, the results are returned and used to create an alert, create a security report, initiate a subsequent fingerprint search, or used to perform any other appropriate computer security action. In some embodiments, the search results may be used to create a visual representation of the different and most common fingerprints among a set of users and their activities over time. In some embodiments, the computer security risk fingerprint search results reflect that no fingerprints match the fingerprint search query.

Figure 7:
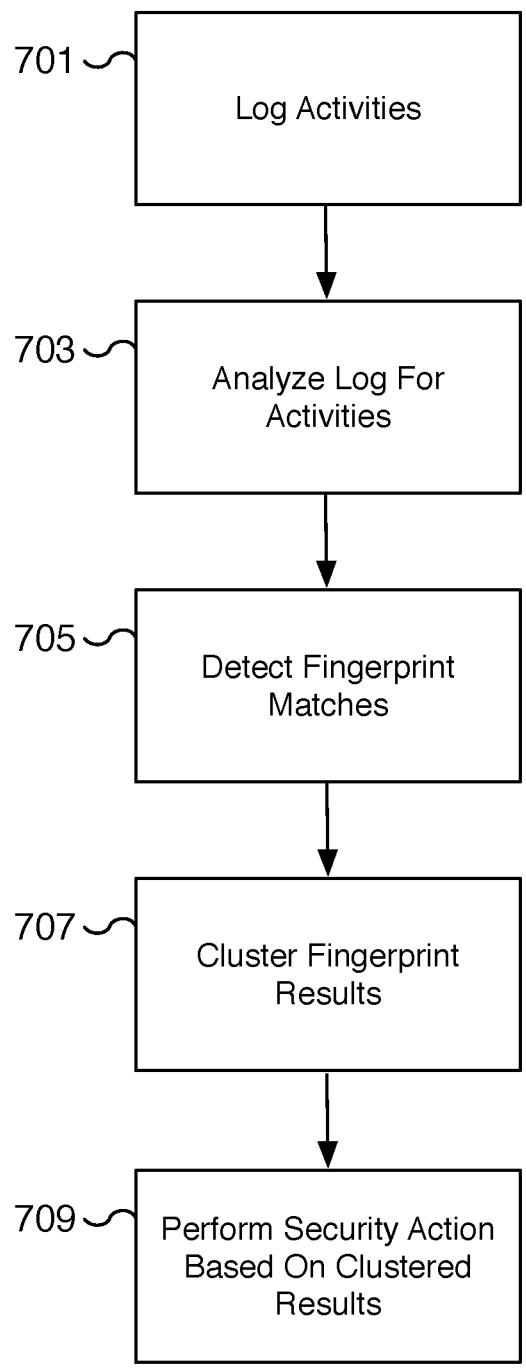
FIG. 7 is a flow diagram illustrating an embodiment of a process for performing behavioral and account fingerprinting.

FIG. 7 is a flow diagram illustrating an embodiment of a process for performing behavioral and account fingerprinting. The process of FIG. 7 may be used to identify and quantify common behavior patterns including fraudulent behaviors by clustering fingerprint results. For example, it may be common that once a malicious user discovers a fraudulent behavior pattern, the fraudulent behavior is utilized repeatedly to defraud additional users and/or the system. By clustering detected fingerprints, potential fraudulent behaviors can be identified in the form of a computer security risk fingerprint. In various embodiments, a computer security action may be performed when the computer security risk fingerprint is detected. In some embodiments, the process of FIG. 7 is performed by server 121 of FIG. 1 by analyzing the monitored activities of clients such as clients 101, 103, and 105 of FIG. 1. In some embodiments, an operator, such as operator 107 of FIG. 1, initiates and/or configures the parameters associated with the process of FIG. 7.

At 701, activities are logged. For example, activities from clients to a software service are monitored and logged. At 703, the monitored activities log is analyzed. For example, the activities monitored and logged at 701 are analyzed at 703. In some embodiments, properties and relevant data associated with each logged activity are retrieved and associated in an activity object or data structure. In various embodiments, the time values are retrieved for each relevant activity. For example, in the event the activity utilizes a time source for the time value, the time value is retrieved from the time source. In some embodiments, the analysis of the logged activities associates a captured time value with each logged activity.

At 705, fingerprint matches are detected. In some embodiments, a fingerprint specification is received and fingerprints are detected based on the specification. In some embodiments, fingerprints are detected based on a time value sorting of the activities for each particular user. In some embodiments, fingerprints are matched and detected based on a fingerprint search query. In some embodiments, and as further described above, the fingerprint match may be based on different parameters such as a complete fingerprint, a partial fingerprint, context requirements, time value restraints, and/or any other appropriate parameters based on an activity and/or fingerprint.

At 707, the detected fingerprints are clustered. For example, similar fingerprints from different users are grouped together and identified as a cluster of fingerprints. In some embodiments, an exact match must exist for fingerprints of different users to be placed in the same cluster. For example, the activities of different users must share the same activity type of identifiers and be ordered in the same sequence to be clustered together. In some embodiments, a partial match is sufficient to cluster similar users. For example, the existence of a one or a combination of activities is sufficient to create and identify a cluster. For example a cluster may be created around fingerprints with the occurrence of a password change activity. In various embodiments, clusters are associated with a count corresponding to the number of fingerprint instances in the cluster. For example, a large cluster has a high count that corresponds to a high number of fingerprints in the cluster and indicates the fingerprint occurs with a high frequency and is a common behavioral pattern. In some embodiments, an instance count for each unique computer security risk fingerprint in a group or cluster of computer security risk fingerprints is determined.

At 709, a security action is performed based on the clustered computer security risk fingerprint results. In various embodiments, the fingerprints of different clients are clustered to determine common behavioral patterns and to identify fraudulent behavior patterns. For example, large clusters indicate common behavioral patterns. As another example, in some embodiments, the clustered fingerprint results are compared to known fraudulent behavior, such as the computer security risk fingerprints of previously detected fraudulent behavior, and a computer security action is performed when a match occurs. In some embodiments, the fingerprints of known hacked accounts and/or malicious users are used to identify and determine potential fraudulent behavior. For example, the fingerprints of a malicious user are used to find matches in the clustered results. The identification of a match to a malicious user's fingerprint in the clustered results indicates a high likelihood the matched fingerprints are associated with fraudulent behavior. A security action may be performed such as additional security screening for accounts associated with the matched clusters. In some embodiments, the IP address and/or country of origin is used to help identify fraudulent behavior. For example, in the event a fingerprint originating from a known hacked IP address matches a cluster, then there is a high likelihood that the cluster should be investigated and that the cluster represents the repeated occurrence of fraudulent behavior. In various embodiments, a security action includes additional analysis that may be performed on one or more of the clustered results.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving activity specifications of a plurality of activities to be monitored, wherein each activity specification of the activity specifications identifies properties of a corresponding activity of the activities to be monitored;
   receiving a fingerprint specification of a computer security risk fingerprint, wherein the fingerprint specification identifies a combination of two or more of the activities to be monitored;
   using a processor to analyze a log of activities to identify occurrences of the activities to be monitored;
   based on the analysis of the log of activities, detecting the computer security risk fingerprint in the log of activities, including by detecting an occurrence of at least a portion of the combination of the activities identified by the fingerprint specification; and
   performing a computer security action based on the detection of the computer security risk fingerprint.

2. The method of claim 1, wherein at least one activity specification of the activity specifications specifies for the corresponding activity a unique identifier, a context, and an identification of a time value to be captured.

3. The method of claim 2, wherein the unique identifier for the corresponding activity is a trigram.

4. The method of claim 2, wherein the context for the corresponding activity is an advertisement page, an advertisement market, or a user.

5. The method of claim 2, wherein the at least one activity specification of the activity specifications specifies a time data source for retrieving the identification of the time value.

6. The method of claim 1, wherein the fingerprint specification further identifies an ordered sequence of the two or more of the activities to be monitored.

7. The method of claim 1, wherein the fingerprint specification further identifies a time restriction between the occurrence of any of the two or more of the activities to be monitored.

8. The method of claim 7, wherein the time restriction includes a maximum time between the occurrence of any of the two or more of the activities to be monitored.

9. The method of claim 1, wherein the plurality of activities to be monitored includes one or more of the following: adding a user to an account, removing a user from an account, adding an administrator to a page, removing an administrator from a page, modifying payment information, modifying a password, or failing a login.

10. The method of claim 1, wherein the computer security action includes one or more of the following: disabling an account, disabling a credit card, disabling an advertisement, setting up a monitoring service, or creating an alert.

11. The method of claim 1, wherein the computer security action includes one or more of the following: displaying a photo identification, an IP address, or a country associated with the computer security risk fingerprint.

12. The method of claim 1, wherein the computer security risk fingerprint is associated with a fraudulent behavior pattern between peer-to-peer payment users.

13. The method of claim 1, wherein the computer security risk fingerprint is included in a group of computer security risk fingerprints detected in the log of activities.

14. The method of claim 13, further comprising:
   determining an instance count for each unique computer security risk fingerprint in the group of computer security risk fingerprints.

15. The method of claim 13, further comprising:
   based on a specified time restriction, identifying at least one of the computer security risk fingerprints among the group of computer security risk fingerprints.

16. The method of claim 13, further comprising:
   based on a query specifying a specific activity or an ordered sequence of activities, identifying at least one of the computer security risk fingerprints among the group of computer security risk fingerprints.

17. The method of claim 13, further comprising:
   identifying one or more clusters of computer security risk fingerprints included in the group of computer security risk fingerprints.

18. The method of claim 17, further comprising:
   identifying a fraudulent behavior pattern based on the one or more clusters.

19. A system comprising:
   a processor; and
   a memory coupled with the processor, wherein the memory is configured to provide the processor with instructions which when executed cause the processor to:
      receive activity specifications of a plurality of activities to be monitored, wherein each activity specification of the activity specifications identifies properties of a corresponding activity of the activities to be monitored;
      receive a fingerprint specification of a computer security risk fingerprint, wherein the fingerprint specification identifies a combination of two or more of the activities to be monitored;

analyze a log of activities to identify occurrences of the activities to be monitored;

based on the analysis of the log of activities, detect the computer security risk fingerprint in the log of activities, including by detecting an occurrence of at least a portion of the combination of the activities identified by the fingerprint specification; and perform a computer security action based on the detection of the computer security risk fingerprint.

20. A computer program product, the computer program product being embodied in a non-transitory computer readable storage medium and comprising computer instructions for:

receiving activity specifications of a plurality of activities to be monitored, wherein each activity specification of the activity specifications identifies properties of a corresponding activity of the activities to be monitored;

receiving a fingerprint specification of a computer security risk fingerprint, wherein the fingerprint specification identifies a combination of two or more of the activities to be monitored;

analyzing a log of activities to identify occurrences of the activities to be monitored;

based on the analysis of the log of activities, detecting the computer security risk fingerprint in the log of activities, including by detecting an occurrence of at least a portion of the combination of the activities identified by the fingerprint specification; and performing a computer security action based on the detection of the computer security risk fingerprint.

* * * * *